March 3, 1970  C. W. TAYLOR, JR., ET AL  3,498,541
APPARATUS FOR ALTERING THE SHAPE OF AN ELECTROSTATIC
SPRAY PATTERN
Filed March 25, 1968  3 Sheets-Sheet 1

INVENTORS
CHARLES W. TAYLOR, JR.
WALTER F. JOHNSTON
WILLIAM M. ROGERS

ATTORNEY

March 3, 1970    C. W. TAYLOR, JR., ET AL    3,498,541
APPARATUS FOR ALTERING THE SHAPE OF AN ELECTROSTATIC
SPRAY PATTERN Filed March 25, 1968      3 Sheets-Sheet 2

INVENTORS
CHARLES W. TAYLOR, JR.
WALTER F. JOHNSTON
WILLIAM M. ROGERS

*P.M.Milliken*

ATTORNEY

United States Patent Office 3,498,541
Patented Mar. 3, 1970

3,498,541
APPARATUS FOR ALTERING THE SHAPE OF AN ELECTROSTATIC SPRAY PATTERN
Charles W. Taylor, Jr., Akron, and Walter F. Johnston and William M. Rogers, Tallmadge, Ohio, assignors to The Goodyear Tire & Rubber Company, Akron, Ohio, a corporation of Ohio
Filed Mar. 25, 1968, Ser. No. 715,808
Int. Cl. B05b 5/00
U.S. Cl. 239—15          8 Claims

ABSTRACT OF THE DISCLOSURE

A method and apparatus for selectively altering the contour of a spray pattern from an electrostatic spray nozzle utilizing an axially adjustable nozzle extension sleeve. The sleeve is made from electroconductive material and carries an electrical charge of the same polarity as the electroconductive portion of the nozzle body so that the spray material passing through the nozzle not only receives an electrical charge from the electrostatic field of the nozzle, but from the extension sleeve and its electrostatic field. The contour of the spray pattern may be altered by adjusting the distance which the sleeve extends beyond the outlet opening of the nozzle and by flexing the extending end of the nozzle to flatten it and thereby flatten the stream emitted therefrom.

---

This invention relates to a method and apparatus for controlling the contour of a spray pattern from an electrostatic nozzle.

PRIOR ART

The closest prior art known to applicants are Patents No. 2,851,307, No. 3,000,574, No. 3,049,301, and No. 3,072,341.

The techniques of electrostatic spraying of liquid or powder material is well-known in the prior art. The usual procedure is to direct a stream of material through a nozzle orifice which carries a negative electrical charge and establishes an electrostatic field which imparts such charge to the materials passing therethrough. The article to be sprayed is grounded. Some of the primary difficulties encountered in prior art devices is in controlling the spray pattern to provide a uniform deposition of spray material on the object to be coated and to avoid overspray which results in wasted material or if the material is collected for respraying, there is more likelihood of contamination of the resprayed material.

Sometimes an object being sprayed is heated to melt and fuse the sprayed material to the object. When this technique is used, if the nozzle is too close to the object being sprayed, the heat from the object heats the nozzle and melts and fuses the material in the nozzle. If the nozzle is moved further away from the object, the spread of the sprayed stream may result in overspray. To correct this overspray without reducing the nozzle to object distance, the spread of the spray stream must be narrowed by nozzle adjustment.

Another problem encountered is that the spray particles are not all uniformly charged and this often results in wasted materials since, unless the materials are properly charged, they will not as readily be attracted to the article being sprayed.

OBJECTS OF THE INVENTION

It is the primary object of this invention to provide a more uniform deposition of spray materials by regulating the contour of the spray pattern from a nozzle in an electrostatic spraying operation.

Another important object of this invention is to reduce the amount of overspray and thereby reduce the waste of sprayed material.

Another object of the invention is to permit the nozzle to be placed farther from the object being sprayed to prevent heat from the object from fusing the sprayed material to the nozzle and causing it to clog.

A still further object of this invention is to minimize the interference of one spray pattern with another when multi-nozzles are used.

Another object of the invention is to provide a more uniform electrostatic charge to the particles of sprayed material.

These and other objects of the invention will become more apparent in the following specification and the appended drawings.

DESCRIPTION OF THE PREFERRED EMBODIMENTS

Figure 1:
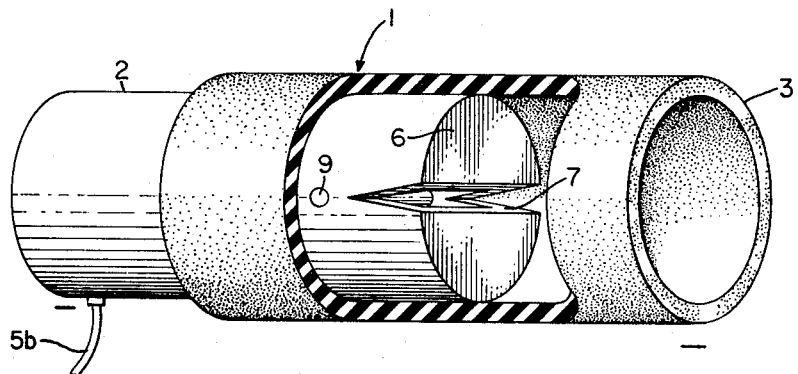
FIGURE 1 is a perspective view of a typical electrostatic spray nozzle having an electroconductive extension sleeve mounted thereon.
Figure 2:
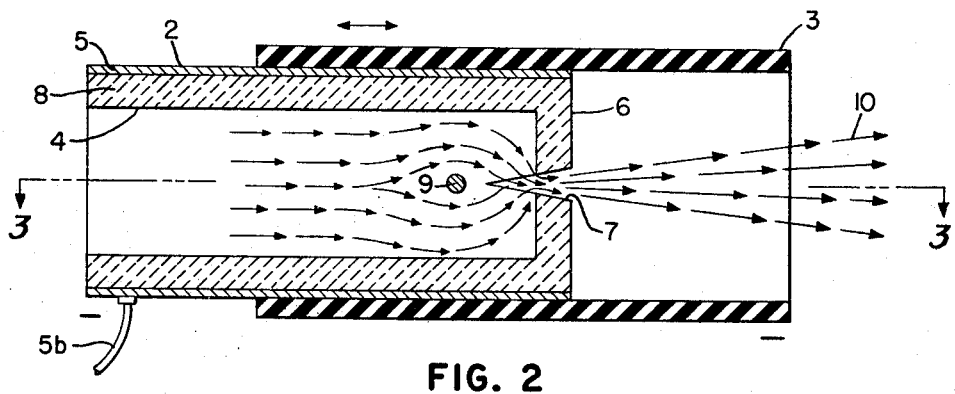
FIGURE 2 is a cross-sectional view taken on line 2—2 of FIGURE 3 through a sleeve and nozzle similar to that shown in FIGURE 1.
Figure 3:
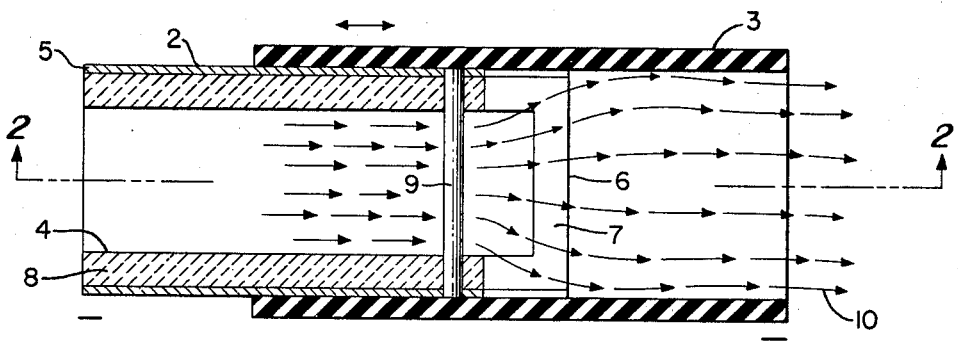
FIGURE 3 is a cross-sectional view taken on line 3—3 of FIGURE 2 of the sleeve and nozzle shown in FIGURE 2.
Figure 4:
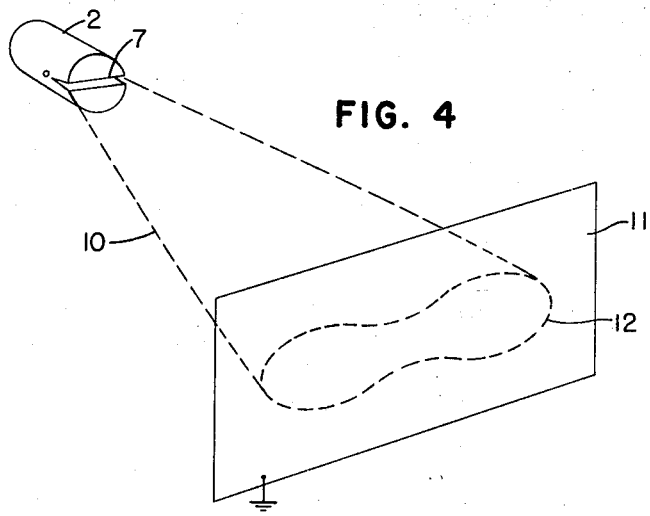
FIGURE 4 is a simplified perspective view of the nozzle shown in FIGURE 1 showing the spray pattern emitted from the nozzle when no extension sleeve is used.
Figure 8:
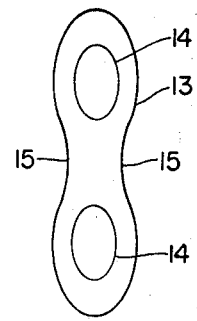
FIGURE 8 shows a schematic plan view of the spray pattern made by the nozzle in FIGURE 5.
Figure 5:
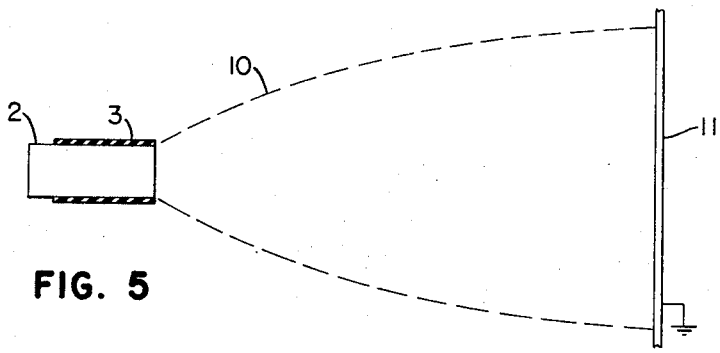
FIGURE 5 shows a schematic plan view of the nozzle shown in FIGURE 4 with the spray pattern emitted from the nozzle when the extension sleeve is in a fully retracted position.
Figure 9:
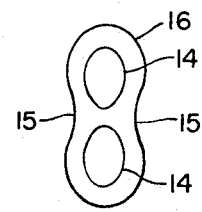
FIGURE 9 shows a schematic plan view of the spray pattern made by the nozzle adjusted as shown in FIGURE 6.
Figure 6:
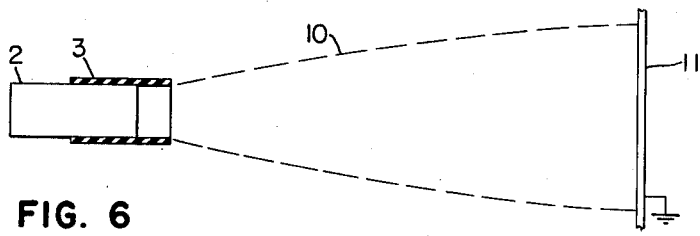
FIGURE 6 is a schematic plan view of the nozzle shown in FIGURE 5 with the extension sleeve in a partially extended position and the spray pattern narrowed.
Figure 10:
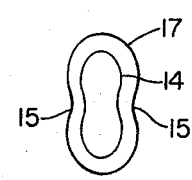
FIGURE 10 shows a schematic plan view of the spray pattern made by the nozzle adjusted as shown in FIGURE 7.
Figure 7:
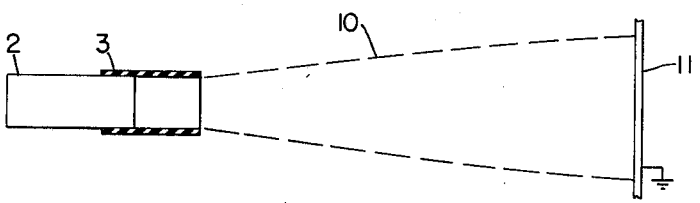
FIGURE 7 is a schematic plan view of the nozzle shown in FIGURE 5 with the extension sleeve in a fully extended position and the width of the spray pattern further reduced.
Figure 11:
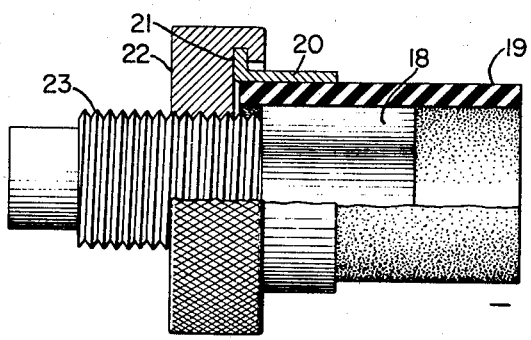
FIGURE 11 is a side elevational view of one embodiment of the invention showing a means for extending and retracting the extension sleeve with parts broken away to better show the internal structure thereof.
Figure 13:
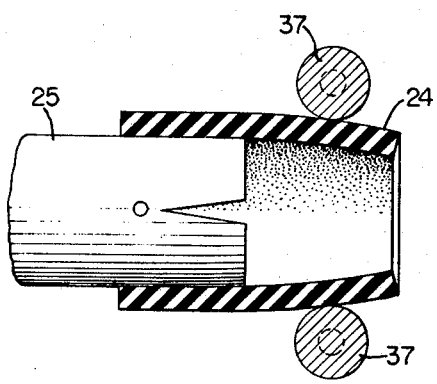
FIGURE 13 is a simplified cross-sectional view further illustrating the operation of the embodiment shown in FIGURE 12.
Figure 12:
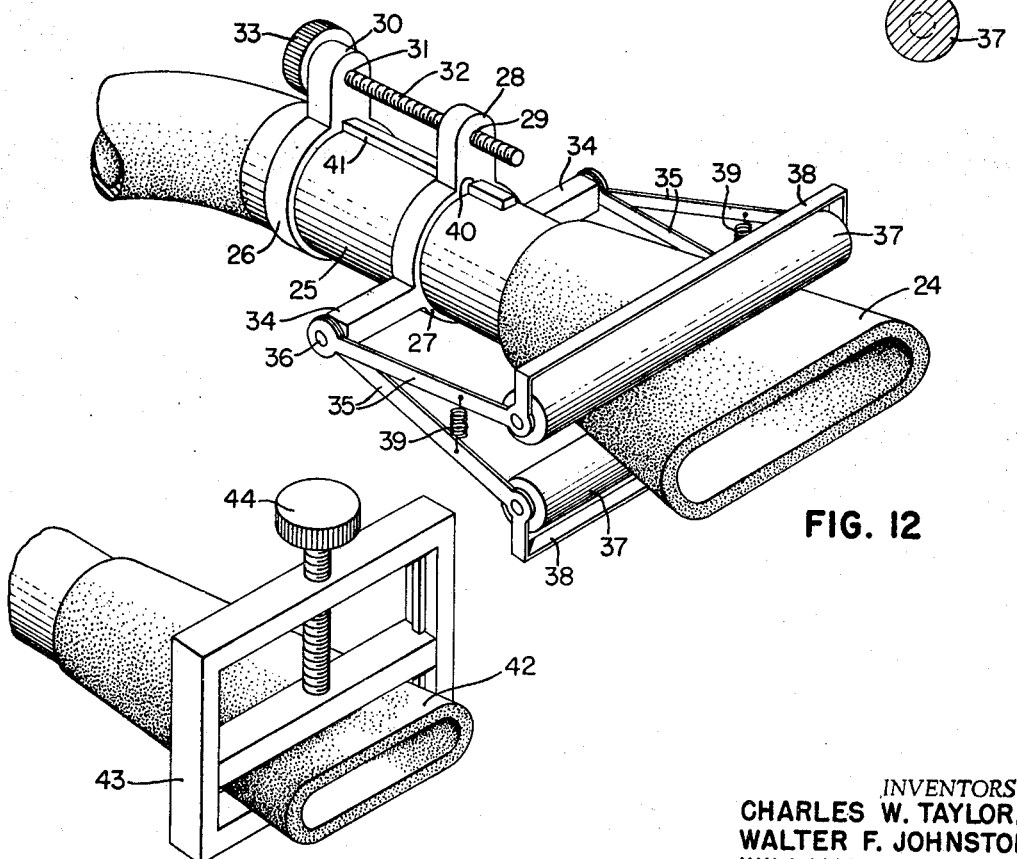
FIGURE 12 is a perspective view of another embodiment of the invention.

Referring now to FIGURES 1 through 3 of the drawings, the nozzle and sleeve assembly is indicated generally by the numeral 1. The assembly is comprised of a cylindrical nozzle 2 having an electroconductive cylindrical sleeve 3 telescopically mounted thereon for axial sliding movement. The nozzle 2 has a nonconductive body member 4 with an electroconductive layer or coating 5 on the outer periphery of the body member 4. The body member 4 is made preferably of a ceramic material but may also be made of plastic or any other nonconductive material which will withstand the passage of sprayed materials therethrough without wearing away too rapidly. The nozzle 2 is open at the inlet end thereof but has a flat end wall 6 at the outlet end thereof. A transverse wedge shaped slot forming an outlet orifice 7 is cut through the end wall 6 and extends a short distance into the cylindrical side wall 8 of the nozzle 2. The elongated outlet orifice 7 emits a flattened stream of spray particles during a spraying operation. A transverse pin 9 extends across the center of the nozzle passage slightly upstream from the orifice 7. As may be seen in FIGURE 2, the pin 9 serves to deflect the particles passing through the nozzle 2 and create a turbulence near the outlet end thereof which tends to increase diffusion of the sprayed particles just prior to their passing through the outlet orifice 7. An electrical conductor line 5*b* is connected to the layer 5 to transmit a negative electrical charge thereto. It will be understood that when spraying with this nozzle, a negative electrical charge is put upon the nozzle and the article to be sprayed is grounded. In this manner, the sprayed particles passing through the nozzle will become electrically charged and will be attracted and attach themselves to an article being coated. The sleeve 3 is made preferably of a resilient electroconductive material such as neoprene with a carbon dispersion therein which gives the sleeve 3 electroconductive properties. It will be understood that the sleeve 3 may be made from any other well-known materials so long as they have the required electroconductive properties. As may be seen in FIGURES 1 through 3, the sleeve 3 is slid onto a nozzle 2 in such manner that it comes in direct contact with the electroconductive layer 5. When an electrical charge is impressed upon the layer 5, it is therefore passed on to the sleeve 3. As a stream of sprayable particles passes through the nozzle 2, they receive an electrical charge from an electrostatic field created by the layer 5. In addition, the particles may receive a further charge from the sleeve 3 and its electrostatic field after passing through the outlet orifice 7.

As shown in FIGURE 2, the elongated orifice 7 tends to flatten the stream of particles indicated by the numeral 10 in such a manner that there is no deflection of the stream by the top or bottom of the sleeve 3.

In FIGURE 3, however, it may be seen that the flattened stream 10 is sufficiently wide that it is deflected by the sides of the sleeve 3 and directed into a more narrow linear path toward the object being sprayed. In other words, the spray pattern is narrowed in the horizontal direction but not in the vertical direction.

Referring now to FIGURE 4, the nozzle 2, having an elongated orifice 7, emits a flattened stream of particles 10 which strike a grounded object 11 to generate a spray pattern 12 which has the shape of an oval which has been squeezed together in the center. A similar spray pattern is shown in FIGURE 5 where the nozzle 2 has a sleeve 3 mounted thereon but in a completely retracted position so that it does not deflect the spray pattern of the stream 10 as it passes through the air toward the object 11.

In FIGURE 8, the spray pattern 13 made by the nozzle shown in FIGURE 5 is similar in contour to the spray pattern 12. When the spray pattern is flattened to this width, a heavy build-up of paint occurs at a center segment 14 on each side of the spray pattern 13. This thicker area located at the segments 14 is undesirable since it creates an uneven coating on the surface being sprayed. The center dips 15 are also undesirable since they tend to create further unevenness in the overall coating.

In FIGURE 6, by extending the sleeve 3 beyond the outlet end of the nozzle, the stream 10 is narrowed to create a spray pattern 16, shown in FIGURE 9, in which the center dips 15 have begun to fill in and the segments 14 have begun to merge into each other and into the remainder of the spray pattern 16.

In FIGURE 7, with the sleeve 3 fully extended beyond the nozzle 2, the stream 10 has been narrowed even further to create a spray pattern 17 in which the two center segments 14 have merged together into a single segment and the center dips 15 have filled in even more. The spray pattern 17, shown in FIGURE 10, provides a much more desirable spray pattern which, when emitted against a surface, will coat the surface much more uniformly than the irregular spray pattern 13 shown in FIGURE 8. The preceding FIGURES 5 through 10 illustrate quite clearly one manner in which the spray pattern may be modified and improved by this invention. Narrowing of the spray pattern 17 will permit the nozzle to be positioned a greater distance from the object being sprayed without creating overspray. This will avoid premature melting of the spray stream in the nozzle which may occur if the nozzle is too close to a heated object being sprayed.

It will be understood that there are many variations and combinations of nozzle orifice shapes and extension sleeve shapes which may be used together to vary the shape of the spray pattern emitted by the nozzle.

Referring now to FIGURE 11, a nozzle 18 of similar construction to the nozzle 2 has an electroconductive extension sleeve 19 telescopically mounted thereon. A ring 20, having a radially outwardly extending flange 21, is attached to the upstream end of the sleeve 19. A threaded collar 22 rotatably engages the flange 21 and is screwed onto a threaded shank portion 23 of the nozzle 18. Upon rotation of the threaded collar 22, the sleeve 19 will move axially in one direction or the other along the nozzle 18. The sleeve 19 may be moved to a fully retracted position on the nozzle 18 or to a fully extended position, as previously illustrated in FIGURES 5 through 7. It will be understood that the assembly shown in FIGURE 11 is merely one way of mechanically adjusting the sleeve 19. Many other devices for adjusting the axial position of the sleeve can be resorted to without departing from the scope of the invention.

Referring now to FIGURE 12, a resilient sleeve 24 is shown mounted on a nozzle 25. In this embodiment, the sleeve 24 may be axially movable on the nozzle 25 or may be fixed in one axial position. Surrounding the nozzle 25 is a fixed ring member 26 and an axially slidable ring member 27. The ring 27 has an upright extension 28 with a threaded hole 29 therethrough running parallel to the axis of the nozzle 25. The ring 26 has a similar upright extension 30 with an unthreaded hole 31 in axial alignment with the threaded hole 29. A threaded bar 32, with a thumb screw 33 fixed to one end thereof, passes through both the hole 31 and the hole 29. The bar 32 engages the hole 31 in such manner that it is free to rotate therein when the thumb screw 33 is turned but will not move in the hole 31 axially with respect to the extension 30. The bar 32, however, threadably engages the hole 29 so that when the thumb screw 33 is rotated, the slidable ring 27 moves axially to and from the ring 26 depending upon which way the thumb screw 33 is rotated. A lateral leg 34 extends from each side of the ring 27 and pivotally carries thereon a pair of roller arms 35 extending from a pivot pin 36 on each side of the nozzle 25. Each of the roller arms 35 on the opposite end from the pivot pin 36 carries one end of a roller 37. Each of the roller arms 35 is rigidly connected to a similar roller arm 35 on the opposite end of the nozzle by a lateral brace 38. The rollers 37 are urged toward each other by a spring 39 connected between a pair of the arms 35 on each side of the nozzle 25. It may be seen that when a resilient nozzle sleeve 24 is used, it will be flattened by the inward pressure of the rollers 37. The amount of flattening of the sleeve 24 can be selectively adjusted by rotating the thumb screw 33 which, in turn, moves the rollers 37 axially along the sleeve 24 to the desired location. In order to prevent circumferential rotation of the ring 27 on the nozzle 25, it may be provided with a suitable keyway 40 which engages a longitudinal key 41 on the nozzle 25. FIGURE 13 shows in cross section the action of the rollers in flattening the sleeve 24.

Figure 14:
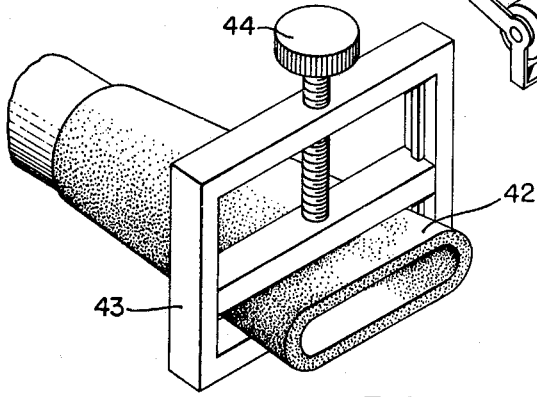
FIGURE 14 is a perspective view showing still another embodiment of the invention.

An alternative manner of controlling the contour is shown in FIGURE 14 wherein a resilient sleeve 42 is positioned in a clamp 43 by turning the thumb screw 44 in one direction or the other. The sleeve 42 can be flattened or expanded to the desired contour.

It will be understood that the flattened sleeve may be used with a nozzle having either the round or elongated orifice and that the circumferential location on the sleeve at which the flattening occurs can be varied greatly depending upon the spray pattern which is desired.

Various changes can be made in the illustrative embodiments shown herein without departing from the scope of the invention.

What is claimed is:

1. A nozzle for electrostatic spraying comprising:
   (A) a generally cylindrical nozzle body member having;
      (1) an inlet opening at one end,
      (2) an outlet opening at the other end,
      (3) a flow passage extending between said openings, and
      (4) an electroconductive surface on at least the outer periphery of the body member;
   (B) a substantially cylindrical electroconductive extension sleeve which;
      (1) has an upstream end and a downstream end,
      (2) is telescopically mounted on the body member for axial movement therealong,
      (3) is movable from a retracted position on the body member to a plurality of extended positions wherein the downstream end of the sleeve progressively moves a greater distance in the downstream direction from the outlet opening in the nozzle until the sleeve is in a fully extended position;
   (C) the spray pattern from such nozzle being widened or narrowed in relationship to the position of the sleeve on the nozzle; and
   (D) the sprayed material receiving an electrostatic charge from both the nozzle and the sleeve.

2. A nozzle as claimed in claim 1 wherein the outlet opening of the nozzle body is an elongated slot running transversely across the nozzle axis to emit a flattened fan shaped stream of spray from the nozzle and wherein the contour of the extension sleeve reduces the width of the flattened stream of spray.

3. A nozzle as claimed in claim 1 including a means for moving the extension sleeve axially with respect to the nozzle and for retaining the sleeve in any desired axial position on the nozzle.

4. A nozzle as claimed in claim 2 wherein the moving and retaining means is a threaded rotary coupling on the upstream end of the sleeve which engages a threaded segment of the exterior of the nozzle and upon rotation of the coupling, moves the sleeve axially along the nozzle.

5. A nozzle as claimed in claim 1 wherein the extension sleeve is made of a resilient material.

6. A nozzle as claimed in claim 5 including a means to selectively and progressively alter the cross-sectional contour of the extension sleeve adjacent the downstream end thereof.

7. A nozzle as claimed in claim 6 wherein the means to alter the sleeve contour is a pair of spring biased pinch rollers which are axially movable along the sleeve.

8. A nozzle as claimed in claim 6 wherein the means to alter the sleeve contour is an adjustable clamp which engages the opposite sides of the sleeve and upon being tightened, will flatten it and impart an oblong cross-sectional contour.

References Cited

UNITED STATES PATENTS

| 2,659,841 | 11/1953 | Hampe | 239—15 |
| 2,851,307 | 9/1958 | Sedlacsik | 239—15 |
| 2,959,359 | 11/1960 | Casaletto | 239—546 |
| 3,000,574 | 9/1961 | Sedlacsik | 239—15 |
| 3,049,301 | 8/1962 | Heuschkel | 239—15 |
| 3,236,679 | 2/1966 | Spiller et al. | 239—3 |

FOREIGN PATENTS 1,219   5/1872   Great Britain.

EVERETT W. KIRBY, Primary Examiner

U.S. Cl. X.R.

239—546